United States Patent
Mizuno et al.

[11] Patent Number: 6,094,092
[45] Date of Patent: Jul. 25, 2000

[54] OVERCURRENT DETECTION CIRCUIT

[75] Inventors: Fumiaki Mizuno; Takashi Hoshino; Yukinobu Tabata, all of Nagoya; Yukihiko Umeda, Toyota, all of Japan

[73] Assignees: Harness System Technologies Research, Ltd., Nagoya; Sumitomo Wiring Systems, Ltd., Mie; Sumitomo Electric Industries, Ltd., Osaka, all of Japan

[21] Appl. No.: 09/129,609

[22] Filed: Aug. 5, 1998

[30] Foreign Application Priority Data

Aug. 8, 1997 [JP] Japan ................................. 9-215296

[51] Int. Cl.$^7$ ...................................................... G01R 19/00

[52] U.S. Cl. ......................... 327/546; 327/540; 327/513; 361/103

[58] Field of Search ..................................... 361/101, 103; 327/540, 538, 519, 545, 546, 513; 323/276

[56] References Cited

U.S. PATENT DOCUMENTS 5,898,557  4/1999  Baba et al. .............................. 361/103

*Primary Examiner*—Dinh T. Le
*Assistant Examiner*—Hiep Nguyen
*Attorney, Agent, or Firm*—Oliff & Berridge, PLC

[57] ABSTRACT

An overcurrent detection circuit comprises: a switch provided between a power supply and a load for switching connection on/off between the power supply and the load; a current detector for detecting a load current flowing in the load; a reference value generator which outputs a reference value of a predetermined first level at the ON-time of the switch means and reduces the level of the reference value with passage of time from the ON-time so as to converge the level of the reference value to a predetermined second level; and an overcurrent signal generator which compares the detected load current with the reference value and outputs an overcurrent signal when the load current reaches or exceeds the reference value.

7 Claims, 4 Drawing Sheets

OVERCURRENT DETECTION CIRCUIT

BACKGROUND OF THE INVENTION

The present invention relates to an overcurrent detection circuit for suitably detecting an overcurrent in a power supply circuit for supplying electric power from a power supply to a load in which a rush current may be generated.

Conventionally, in a power supply circuit for supplying electric power from a battery to a load such as an electric equipment installed in a car, a protection means has been used for protecting the load or electric wires from an overcurrent. For example, Postexamined Japanese Patent Publication 8-14598 discloses a protection means, in which two stages of overcurrent detection lines are provided by use of a semiconductor switch with an electric current detection function (Intelligent Power Switch) or the like, so that a load such as a lamp in which a rush current may be generated can be protected from an overcurrent.

Generally, a conductor of an electric wire is formed by twisting strands. In the case of investigation on the detection of an overcurrent in such an electric wire, it is necessary to investigate not only the case where the twisted wire without fraying is coated with insulating coating resin entirely, but also the case where the insulating coating is broken partially and the strands fray partially so as to appear outside so that the strands may come into contact with other conductors such as a grounded line, etc.

In the case where a coating is broken as mentioned above, a current is concentrated on fewer strands in the conductor, so that the temperature rising of the conductor becomes larger than that in the above-mentioned case where the coating is complete even if an overcurrent is at the same level. Accordingly, because of heating of the conductor, the coating overheats in a shorter time so that the heat-aging of the coating resin is accelerated.

In the worst case, only one of the strands constituting the twisted wire frays and comes outside so as to be in contact with a grounded line. FIG. 6 shows the heat-aging characteristic of an electric wire. The heat-aging characteristic indicates a conduction time taken for heat-aging of coating resin to begin to progress suddenly when a certain value of current is being applied to an electric wire. The heat-aging characteristic A1 at the time of one strand short-circuits is shifted to the lower current side than the heat-aging characteristic A2 in the condition of complete coating.

In such a case, it is difficult to cope with the one-strand heat-aging characteristic A1 only by two-stage overcurrent detection based on detection characteristic A3 shown by one-dot chain line in FIG. 6 as disclosed in the above-mentioned JP 8-14598.

In order to perform two-stage overcurrent detection, therefore, it is necessary to shorten the initial detection time T for large current detection in view of the one-strand heat-aging characteristic A1 and normal load current characteristic A4. Alternatively, it will go well if the detection characteristic has a number of stages such as three-stage detection characteristic A5 shown by broken line in FIG. 6.

In order to shorten the detection time T for large current detection, however, it is necessary to count the detection time T with high accuracy. On the other hand, in order to perform multi-stage overcurrent detection, there is a problem that the number of parts constituting the circuit increases so that the circuit becomes large in size.

SUMMARY OF THE INVENTION

The present invention is intended to solve the foregoing problems, and it is an object thereof to provide an overcurrent detection circuit in which an overcurrent of a load in which a rush current may be generated can be detected suitably with a simple circuit configuration.

According to an aspect of the present invention, provided is an overcurrent detection circuit comprising: a switch means provided between a power supply and a load for switching connection on/off between the power supply and the load; a current detection means for detecting a load current flowing in the load; a reference value output means which outputs a reference value of a predetermined first level at the ON-time of the switch means and reduces the level of the reference value with passage of time from the ON-time so as to converge the level of the reference value to a predetermined second level; and an overcurrent signal output means which compares the detected load current with the reference value and outputs an overcurrent signal when the load current reaches or exceeds the reference value.

According to this configuration, when the connection between the power supply and the load is turned on, a load current flowing in the load is detected, and the detected load current is compared with a reference value. If the load current becomes not smaller than the reference value, an overcurrent signal is outputted. The reference value is at a predetermined first level at the ON-time of the switch means. The level of the reference value is reduced with passage of time from the ON-time so as to be converged to a predetermined second level. As a result, an overcurrent in the load in which a rush current may be generated is detected suitably.

In the above overcurrent detection circuit, preferably, the current detection means is constituted by a voltage converting circuit for converting the load current into a voltage of a level proportional to the load current; and the reference value output means is constituted by a reference voltage generating circuit for generating a reference voltage of the second level, and a charge/discharge circuit which outputs a charge voltage charged from the second level to the first level when the switch means is turned off, and which discharges the charged voltage at a predetermined time constant when the switch means is turned on.

According to this configuration, the reference voltage of the second level is generated. When the switch means is in the off-state, a charged voltage charged from the second level to the first level is outputted. When the switch means is turned on, the charged voltage is discharged at a predetermined time constant. As a result, a voltage of the first level is outputted as the reference value at the ON-time of the switch means. The level of the voltage is reduced with passage of time from the ON-time so as to be converged to the second level. This reference value and the voltage of the level proportional to the load current are compared with each other, so that an overcurrent is detected properly.

In the above overcurrent detection circuit, preferably, there are further provided an overcurrent judgement means for making a judgment as to whether the overcurrent signal is outputted or not, and an overcurrent control means for turning the switch means off when the judgment proves that the overcurrent signal is outputted.

According to this configuration, it is judged whether the overcurrent signal is outputted or not. The switch means is turned off in response to the conclusion that the overcurrent signal is outputted. Accordingly, the state of overcurrent is prevented from continuing.

DETAILED DESCRIPTION OF THE PREFERRED EMBODIMENTS

Figure 1:
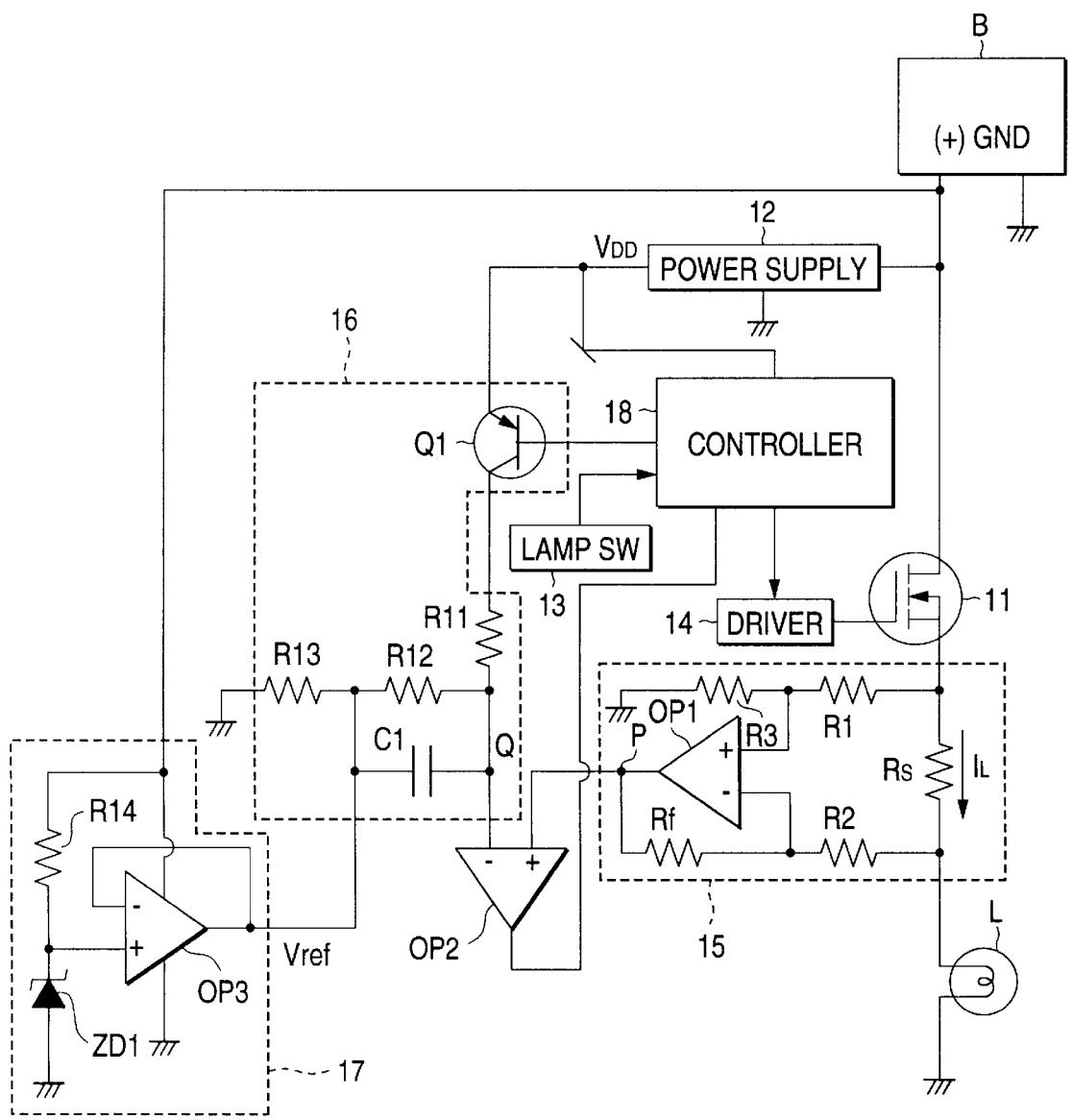
FIG. 1 is a circuit diagram of an embodiment of the overcurrent detection circuit according to the present invention.

FIG. 1 is a circuit diagram showing an embodiment of the overcurrent detection circuit according to the present invention.

This embodiment is applied to a car lamp control circuit for controlling power supply from a battery (power supply) B to a lamp (load) L in a car. The lamp control circuit is constituted by an FET 11, a power supply circuit 12, a lamp switch 13, a driving circuit 14, a voltage converting circuit 15, a charge/discharge circuit 16, a reference voltage generating circuit 17, a control portion 18, a comparator OP2, and so on.

The battery B is a power supply which outputs a constant voltage $V_B$ of about DC 12V. The power supply circuit 12 uses a not-shown three-terminal regulator so as to output a predetermined voltage $V_{DD}$ (DC 5V in this embodiment).

The lamp switch 13 is operated from the outside so as to be turned on/off to thereby output an on/off signal which is an instruction to turn on/off the lamp L. The on/off signal is supplied to the control portion 18. The driving circuit 14 is constituted by a transistor, and so on, so as to apply a gate voltage to the FET 11 to turn the FET 11 on in response to a control signal supplied from the control portion 18.

The voltage converting circuit 15 is constituted by an operational amplifier OP1, a shunt resistor Rs, and resistors R1, R2, R3 and Rf, and acts to convert a load current $I_L$ flowing in the lamp L into a voltage in proportion to the load current $I_L$.

The FET 11 and the shunt resistor Rs are connected in series between the battery B and the lamp L. More in detail, in the FET 11, the drain is connected to the positive pole of the battery B, the source is connected to one end of the shunt resistor Rs, and the gate is connected to the output terminal of the control portion 18 through the driving circuit 14. The other end of the shunt resistor Rs is grounded through an electric wire W and the lamp L. With such a configuration, electric power is supplied to the lamp L from the battery B through the shunt resistor Rs and the electric wire W when the FET 11 is turned on.

The shunt resistor Rs is low in resistance and acts to detect the load current $I_L$. The resistor R1 is connected at its one end to the one end of the shunt resistor Rs. The other end of the resistor R1 is connected to the not-inverted input terminal of the operational amplifier OP1, and, at the same time, grounded through the resistor R3. On the other hand, the resistor R2 is connected at its one end to the other end of the shunt resistor Rs. The other end of the resistor R2 is connected to the inverted input terminal of the operational amplifier OP1, and, at the same time, connected to the output terminal of the operational amplifier OP1 through the feedback resistor Rf. The output terminal (hereinafter referred to as "a point P") of the operational amplifier OP1 is connected to the not-inverted input terminal of the comparator OP2.

The charge/discharge circuit 16 is constituted by resistors R11, R12 and R13, a capacitor C1 and a transistor Q1. In the transistor Q1, the emitter is connected to the output terminal of the power supply circuit 12, the base is connected to the output terminal of the control portion 18, and the collector is connected to the inverted input terminal (hereinafter referred to as "a point Q") of the comparator OP2 through the resistor R11. The output terminal of the comparator OP2 is connected to the input terminal of the control portion 18.

One end of a parallel circuit constituted by the resistor 12 and the capacitor C1 is connected to the inverted input terminal of the comparator OP2, and the other end of this parallel circuit is connected to one end of the resistor R13. The other end of the resistor R13 is grounded.

The reference voltage generating circuit 17 is constituted by an operational amplifier OP3, a resistor R14 and a Zener diode ZD1 so that the circuit 17 generates a reference voltage $V_{ref}$ (a reference voltage of a second level). The power supply terminal of the operational amplifier OP3 is connected to the positive pole of the battery B, and, at the same time, grounded through a series circuit constituted by the resistor R14 and the Zener diode ZD1. In the operational amplifier OP3, the output terminal is connected to the junction point between the resistors R12 and R13, the inverting input terminal is connected directly to the output terminal of the operational amplifier OP3, and the not-inverted input terminal is connected to the junction point between the resistor R14 and the Zener diode ZD1.

The comparator OP2 has a function to act as an overcurrent signal output means. That is, the comparator OP2 compares the voltage $V_P$ at the point P which is proportional to the load current $I_L$ with the voltage $V_Q$ at the point Q as a reference value, and supplies a low-level signal to the control portion 18 when $V_P<V_Q$ while it supplies an overcurrent signal of a high level to the control portion 18 when $V_P>V_Q$.

The control portion 18 is constituted by a CPU, and so on, so as to control the operation of the lamp control circuit. The control portion 18 has functions (1) to (4) as follows.

(1) It controls on/off of the FET 11 through the driving circuit 14 in response to on/off of the lamp switch 13 to thereby control the turn-on/turn-off of the lamp L.

(2) It supplies a low-level signal to the base of the transistor Q1 to thereby turn the transistor Q1 on when the lamp switch 13 is turned off, and supplies a high-level signal to thereby turn the transistor Q1 off when the lamp switch 13 is turned on.

(3) It acts as an overcurrent judging means for making a judgment as to whether the load current $I_L$ is an overcurrent or not on the basis of a signal level supplied from the comparator OP2.

(4) It acts as an overcurrent control means for turning the FET 11 off through the driving circuit 14 when it is concluded that the load current $I_L$ is an overcurrent.

When the FET 11 is turned off on the basis of the conclusion that the load current $I_L$ is an overcurrent, a status signal informing of the fact may be outputted.

In this configuration, by using the shunt resistor Rs, not only the load current $I_L$ applied to the lamp L can be detected with high accuracy, but also a sudden change in current can be detected. In addition, if a resistor with low temperature dependency is used as the shunt resistor Rs, it is possible to improve the current detection accuracy against changes in the atmospheric temperature.

In addition, if the reference voltage generating circuit 17 is constituted by a so-called voltage follower circuit using an operational amplifier, it is possible to generate a constant reference voltage $V_{ref}$ independently of the current flowing in the resistors R12 and R13.

This reference voltage $V_{ref}$ is set to a little higher level than the voltage $V_{Pmax}$ obtained by a maximum value $I_{Lmax}$ of the load current in the stationary state.

Next, description will be made about the operation of the thus configured overcurrent detection circuit.

When the lamp switch 13 is in the off-state and the lamp L is therefore in the off-state, the transistor Q1 is in the on-state, so that the capacitor C1 is being charged. The voltage $V_Q$ at the point Q at this time takes a value which is determined by the ratio of the resistor R11 to the resistor R12 and the reference voltage $V_{ref}$.

When the lamp switch 13 is turned on, the FET 11 is turned on. Accordingly, the lamp L is supplied with the load current $I_L$ and therefore turned on, while the transistor Q1 is turned off.

A voltage drop appearing across the shunt resistor Rs and being proportional to the load current $I_L$ is converted into a voltage by the operational amplifier OP1. The voltage $V_P$ at the point P takes a value expressed by the following Equation 1.

[Equation 1]

$$V_P = I_L \cdot R_S (R_f / R_2)$$

Here, $R_s$ designates a resistance value of the shunt resistor Rs, $R_f$ designates a resistance value of the feedback resistor Rf, and $R_2$ designates a resistance value of the resistor R2. In addition, it is assumed that the resistance value of the resistor R1 is equal to that of the resistor $R_2$, and the resistance value of the resistor R3 is equal to that of the resistor $R_f$.

On the other hand, when the transistor Q1 is turned off, the capacitor C1 begins to discharge. The voltage $V_Q$ at the point Q at this time changes as shown in the following Equation 2.

[Equation 2]

$$V_Q = V_0 \cdot \exp(-t/(R_{12}C_1)) + V_{ref}$$

Here, $V_0$ designates a voltage across the capacitor C1 charged fully, and the voltage $V_Q = V_0 + V_{ref}$ at this time corresponds to the reference voltage of the first level. In addition, $R_{12}$ designates a resistance value of the resistor R12, $C_1$ designates a capacitance of the capacitor C1, and t designates an elapsed time since the transistor Q1 is turned on, that is, since the FET 11 is turned on.

As is understood from the above Equation 2, the voltage $V_Q$ approaches the voltage $V_{ref}$ infinitely when time passes enough since the FET 11 is turned on.

The changes of the voltages $V_P$ and $V_Q$ will be described with reference to FIGS. 2 and 3.

Figure 2:
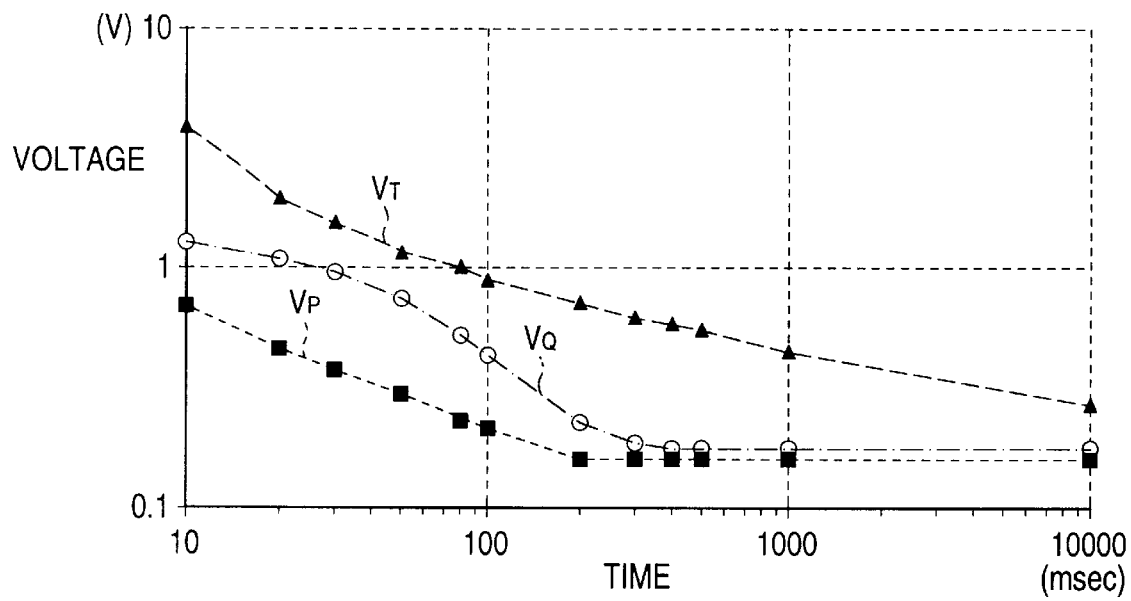
FIG. 2 is a graph showing an example of a change in voltage.
Figure 3:
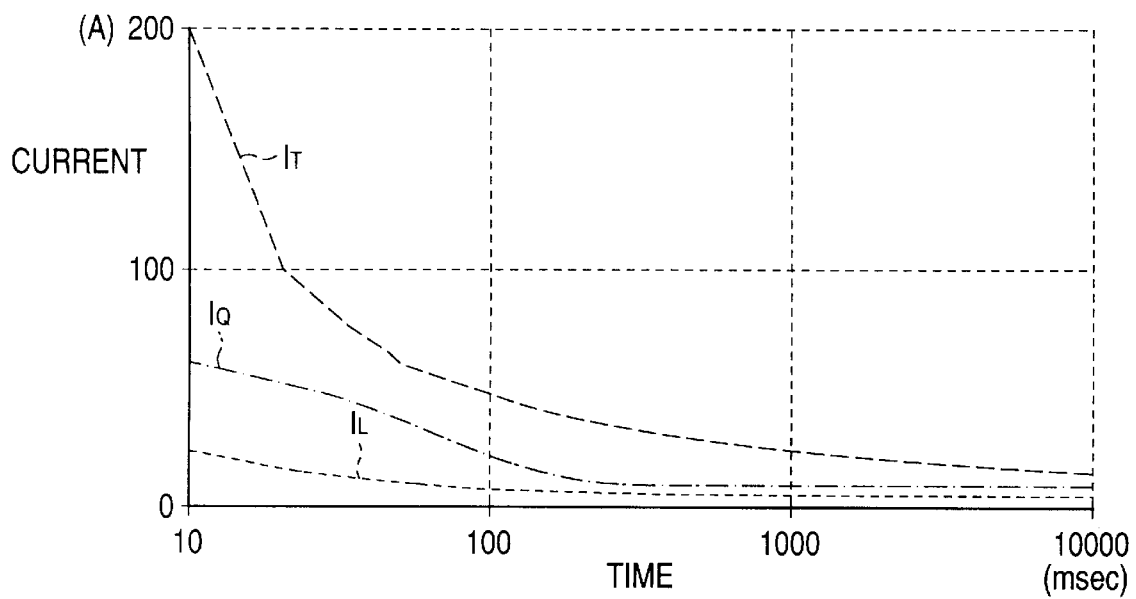
FIG. 3 is a graph showing a change in current in the case of FIG. 2.

FIG. 2 is a graph showing an example of the change in voltage when a head lamp of 65 W is used as the lamp L, and FIG. 3 is a graph showing the change in current in the case of FIG. 2.

In the case of FIGS. 2 and 3, the values of the respective circuit parts are set so that $R_S$=0.021 Ω, $V_0$=1.46V, $R_{12}C_1$= 0.062, and $V_{ref}$=0.18.

In FIG. 3, $I_T$ designates a current at a level by which coating material of an electric wire of a single strand is aged by heat, that is, this current $I_T$ shows a heat-aging characteristic of a single strand. In addition, $I_Q$ designates a current on an overcurrent detection line according to this embodiment.

In FIG. 2, $V_T$ designates a voltage appearing at the point P when the current $I_T$ flows in the shunt resistor Rs.

As shown in FIG. 2, if the values of the capacitor C1, the resistor R12 and other circuit parts are adjusted properly, a voltage which is larger than the voltage $V_P$ generated by a rush current flowing in the lamp L, and smaller than the voltage $V_T$ generated by a current at a sufficient level to age a single strand by heat can be generated while being changed with the passage of time, as the voltage $V_Q$ at the point Q which is a reference value to be supplied to the comparator OP2.

As has been described above, according to this embodiment, it is possible to generate an overcurrent detection line $I_Q$ larger than the normal load current $I_L$ and smaller than the current $I_T$ with the heat-aging characteristic of a single strand as shown in FIG. 3, without providing any complicated circuit such as a timer circuit, a multi-stage current detection circuit, or the like. Consequently, an overcurrent in a load such as the lamp L in which a rush current may be generated can be detected with accuracy by a simple-configuration circuit constituted by resistors, capacitors, operational amplifiers, etc.

In summary, the voltage at a point P proportional to the load current $I_L$ of a lamp L is compared by a comparator OP2 with the voltage at a point Q as a reference value for overcurrent detection. The voltage obtained by adding the voltage charged in a capacitor C1 of a charge/discharge circuit 16 to the reference voltage $V_{ref}$ generated in a reference voltage generating circuit 17 is used as the reference value for overcurrent detection. When an FET 11 is turned on so that the load current $I_L$ begins to be supplied, the charged voltage of the capacitor C1 is discharged, so that the reference value decreases. Accordingly, it is possible to suitably detect an overcurrent in the lamp L which is a load in which a rush current may be generated.

Figure 4:
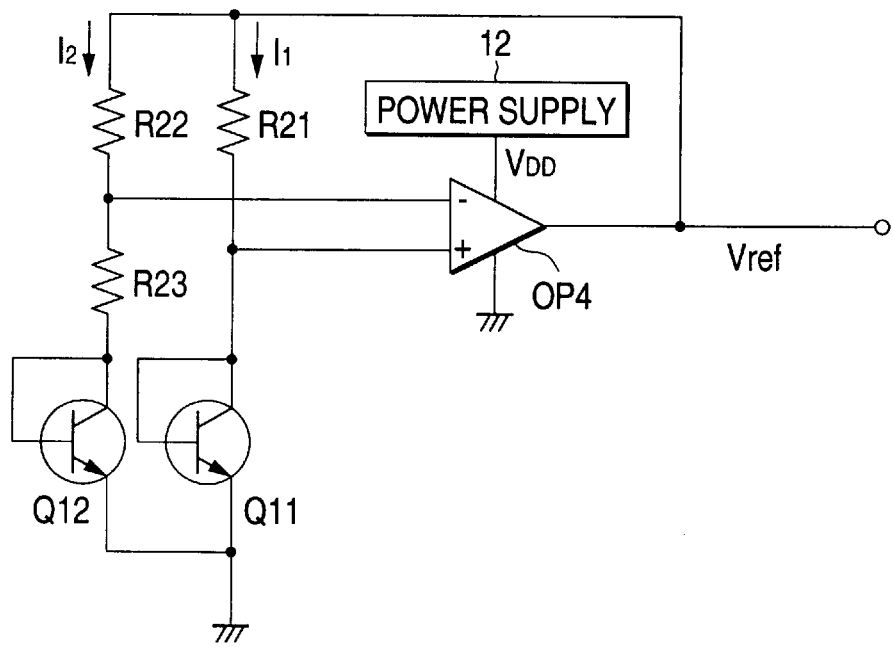
FIG. 4 is a circuit diagram showing a modification of the reference voltage generating circuit.
Figure 5:
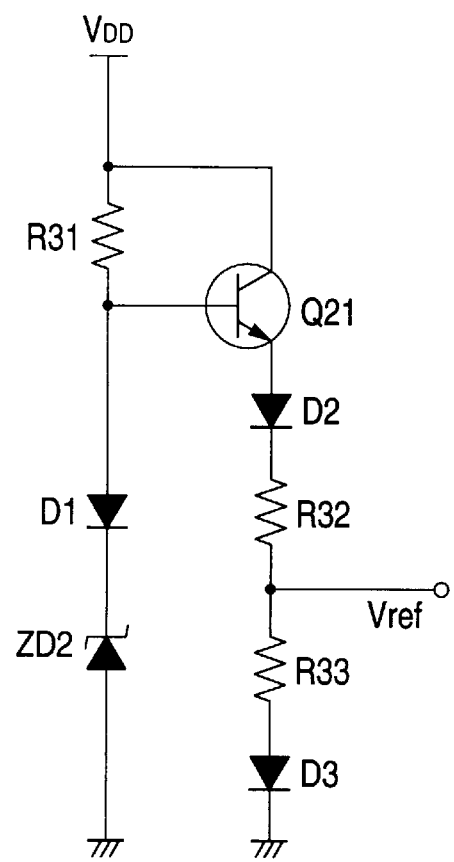
FIG. 5 is a circuit diagram showing another modification of the reference voltage generating circuit.
Figure 6:
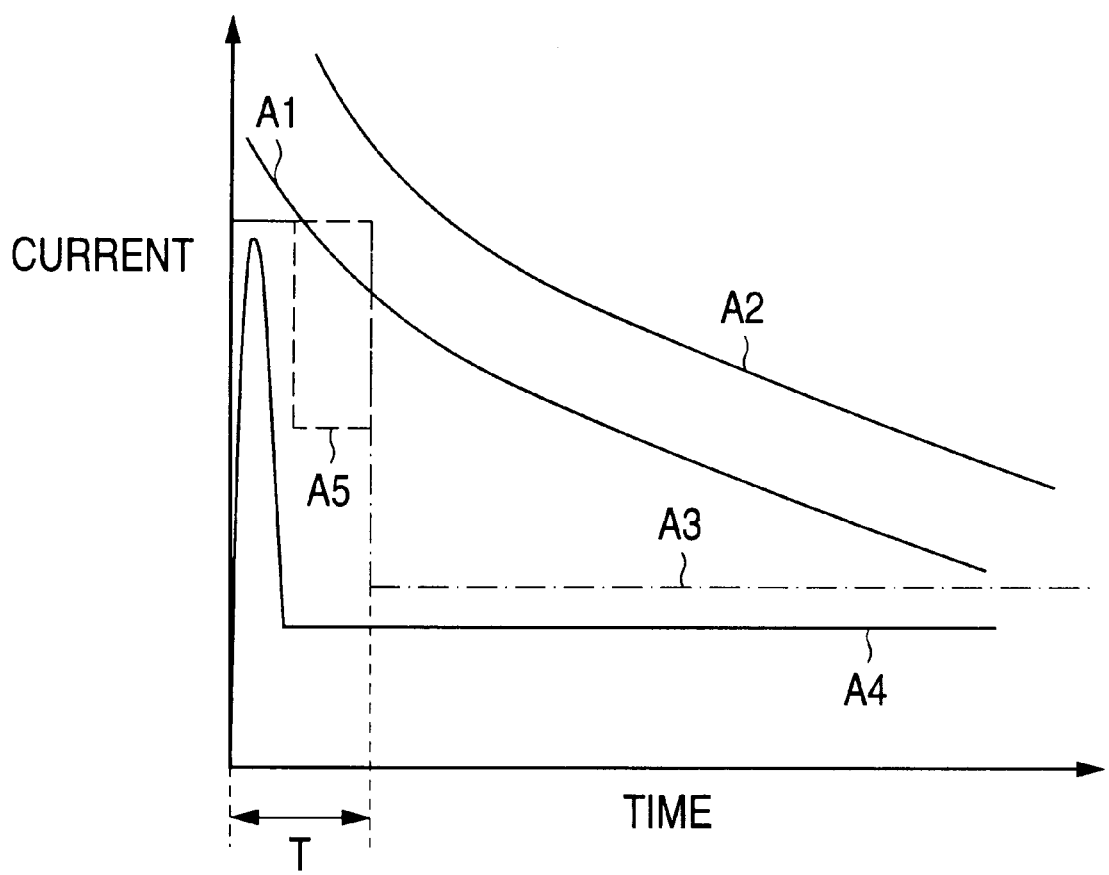
FIG. 6 is a diagram for explaining problems in prior art.

The reference voltage generating circuit 17 is not limited to that shown in this embodiment, but may be configured as shown in FIGS. 4 and 5. That is, FIG. 4 is a circuit diagram showing a modification of the reference voltage generating circuit 17.

In FIG. 4, the reference voltage generating circuit 17 is constituted by an operational amplifier OP4, resistors R21 to R23, and transistors Q11 and Q12. The not-inverted input terminal of the operational amplifier OP4 is connected to its own output terminal through the resistor R21, and connected to the collector of the transistor Q11. On the other hand, the inverted input terminal of the reference voltage generating circuit 17 is connected to its own output terminal through the resistor R22, and connected to the collector of the transistor Q12 through the resistor R23.

The emitters of both the transistors Q11 and Q12 are grounded, and the respective bases of the transistors Q11 and Q12 are connected to their own collectors to thereby form so-called diode-connections. In addition, this circuit is designed such that the reference voltage $V_{ref}$ is outputted from the output terminal of the operational amplifier OP4.

Next, description will be made about the reference voltage $V_{ref}$ generated by the circuit shown in FIG. 4.

If this circuit has a stable operating point, the differential input voltage of the operational amplifier OP4 becomes zero. As a result, the voltage drop at the resistor R21, that is, $VR_{21} = I_1 R_{21}$, is equal to the voltage drop at the resistor R22, that is, $VR_{22} = I_2 R_{22}$, so that the following Equations 1 and 2 are established.

[Equation 1]

$$I_1 R_{21} = I_2 R_{22} \quad (1)$$

Here, $I_1$ designates the current flowing in the resistor R21, $I_2$ designates the current flowing in the resistor R22, $R_{21}$ designates the resistance value of the resistor R21, and $R_{22}$ designates the resistance value of the resistor R22.

[Equation 2]

$$V_{R23}=V_{BE1}-V_{BE2} \qquad (2)$$

Here, $V_{R23}$ designates a voltage drop across the resistor R23, $V_{BE1}$ designates a base-to-emitter voltage of the transistor Q11, and $V_{BE2}$ designates a base-to-emitter voltage of the transistor Q12.

On the other hand, a characteristic equation expressed by the following Equation 3 is generally established in a transistor.

[Equation 3]

$$I_E=I_S\{(\exp(V_{BE}/V_T)-1\} \qquad (3)$$

Here, $I_E$ designates an emitter current, $I_S$ designates a saturation current, $V_{BE}$ designates a base-to-emitter voltage, and $V_T$ designates a thermal voltage expressed by $V_T=kT/q$ (k is a Boltzmann constant, T is an absolute temperature, and q is an electron charge).

Here, because of $I_C=I_E\cdot\exp(V_{BE}/V_T)>1$, the following Equation 4 is obtained from the above Equation 3.

[Equation 4]

$$I_C=I_S\cdot\exp(V_{BE}/V_T) \qquad (4)$$

Here, $I_C$ designates a collector current.

This Equation 4 can be rewritten to obtain the following Equation 5.

[Equation 5]

$$V_{BE}=V_T\cdot\ln(I_C/I_S) \qquad (5)$$

If the Equation 5 is substituted into the above Equation 2, the following Equation 6 is obtained because the collector currents of the transistors Q11 and Q12 are $I_1$ and $I_2$ respectively.

[Equation 6]

$$V_{R23}=V_T\cdot\ln(I_1/I_{S1})-V_T\cdot\ln(I_2/I_{S2})=V_T\cdot\ln\{(I_1\cdot I_{S2})/(I_2\cdot I_{S1})\} \qquad (6)$$

Here, $V_{R23}$ designates a voltage drop across the resistor R23, $I_{S1}$ designates a saturation current of the transistor Q11, and $I_{S2}$ designates a saturation current of the transistor Q12.

If this Equation 6 is substituted into the above Equation 1, the following Equation 7 is obtained.

[Equation 7]

$$V_{R23}=V_T\cdot\ln\{(R_{22}\cdot I_{S2})/(R_{21}\cdot I_{S1})\} \qquad (7)$$

On the other hand, because of $V_{R23}/R_{23}=V_{R22}/R_{22}=I_2$, the following Equation 8 is obtained.

[Equation 8]

$$V_{R22}=(R_{22}/R_{23})\cdot V_{R23} \qquad (8)$$

Here, $V_{R22}$ designates a voltage drop across the resistor R22. Accordingly, the following Equation 9 is obtained from the above Equation 7 and this Equation 8.

[Equation 9]

$$V_{R22}=(R_{22}/R_{23})\cdot V_T\cdot\ln\{(R_{22}\cdot I_{S2})/(R_{21}\cdot I_{S1})\} \qquad (9)$$

Here, as is understood from FIG. 4, the reference voltage $V_{ref}$ takes a value as follows.

[Equation 10]

$$V_{ref}=V_{BE1}+V_{R21} \qquad (10)$$

Therefore, because of $V_{R21}=V_{R22}$ as described above, the reference voltage $V_{ref}$ generated by the circuit in FIG. 4 can be expressed as follows.

[Equation 11]

$$V_{ref}=V_{BE1}+(R_{22}/R_{23})\cdot V_T\cdot\ln\{(R_{22}\cdot I_{S2})/(R_{21}\cdot I_{S1})\} \qquad (11)$$

Generally, the base-to-emitter voltage $V_{BE}$ of a transistor has a temperature characteristic shown in the following Equation 12.

[Equation 12]

$$V_{BE}=A-C\cdot\Delta T \qquad (12)$$

Here, A and C designate constants respectively, and $\Delta T$ designates a change in temperature.

Therefore, if a transistor having a characteristic of C=2 mV/° C. is used as the transistor Q21, and the values are set as $R_{21}$=1 kΩ, $R_{22}$=10 kΩ, and $R_{23}$=1 kΩ, the temperature dependency in the first and second terms of the right side of the above Equation 11 can be canceled substantially.

As has been described above, according to the circuit shown in FIG. 4, it is possible to generate a reference voltage $V_{ref}$ independent of temperature.

FIG. 5 is a circuit diagram showing another modification of the reference voltage generating circuit 17.

This reference voltage generating circuit 17 is constituted by a transistor Q21, resistors R31 to R33, diodes D1 to D3, and a Zener diode ZD2.

The resistor R31, the diode D1 in the forward direction, and the Zener diode ZD2 in the reverse direction are connected in series to the output terminal of the power supply circuit 12 (see FIG. 1). The anode of the Zener diode ZD2 is grounded.

In addition, in the transistor Q21, the collector is connected to the output terminal of the power supply circuit 12 (see FIG. 1), the base is connected to the junction point between the resistor R31 and the diode D1, and the emitter is connected to the anode of the diode D2. The resistors R32 and R33, and the diode D3 in the forward direction are connected in series to the cathode of the diode D2. The cathode of the diode D3 is grounded. The reference voltage generating circuit 17 is designed so that the reference voltage $V_{ref}$ is outputted from the junction point between the resistors R32 and R33.

The reference voltage $V_{ref}$ generated in this circuit is expressed by the following Equation 12.

[Equation 12]

$$V_{ref}=(V_{ZD}+V_{D1}-V_{BE}-V_{D2}-V_{D3})\cdot R_{33}/(R_{32}+R_{33})+V_{D3} \qquad (12)$$

Here, $V_{ZD}$ designates the Zener voltage of the Zener diode ZD2, VD1, VD2 and VD3 designate the forward-direction voltages of the diodes D1, D2 and D3 respectively, $V_{BE}$ designates the base-to-emitter voltage of the transistor Q21, and $R_{32}$ and $R_{33}$ designate the resistances of the resistors R32 and R33 respectively.

Therefore, according to the circuit shown in FIG. 5, if the Zener voltage $V_{ZD}$, the forward-direction voltages $V_{D1}$, $V_{D2}$ and $V_{D3}$ of the diodes D1, D2 and D3, and the resistances $R_{32}$ and $R_{33}$ of the resistors R32 and R33 are adjusted properly, it is possible to generate a desired reference voltage $V_{ref}$.

In addition, if the resistances $R_{32}$ and $R_{33}$ of the resistors R32 and R33 are adjusted properly, it is possible to reduce the influence of the temperature dependency of the Zener diode ZD2 and the diodes D1, D2 and D3 on the reference voltage $V_{ref}$. In addition, it is possible to generate a constant reference voltage $V_{ref}$ without any influence of a change in impedance of the charge/discharge circuit 16.

As has been described above, according to the present invention, the level of the reference value set to a predetermined first level at the ON-time of the switch means and then reduced with passage of time from the ON-time so as to be converged to a predetermined second level. A detected load current is compared with the reference value, and when the load current is larger than the reference value, an overcurrent signal is outputted. Accordingly, it is possible to suitably detect an overcurrent in the load in which a rush current may be generated.

Further, the reference voltage of the second level is generated. When the switch means is in the off-state, a charged voltage charged from the second level to the first level is outputted. When the switch means is turned on, the charged voltage is discharged at a predetermined time constant. As a result, a voltage of the first level is outputted as the reference value at the ON-time of the switch means. The level of the voltage is reduced with passage of time from the ON-time so as to be converged to the second level. This reference value and the voltage of the level proportional to the load current are compared with each other, so that an overcurrent is detected properly.

Further, it is judged whether the overcurrent signal is outputted or not. The switch means is turned off in response to the conclusion that the overcurrent signal is outputted. Accordingly, the state of overcurrent is prevented from continuing.

What is claimed is:

1. An overcurrent detection circuit comprising:
   a controller:
   a switch provided between a power supply and a load, the switch electrically connecting said power supply and said load in an ON state of said switch and breaking electrical contact between said power supply and said load in an OFF state of said switch in response to instructions from said controller;
   a current detector that detects a load current flowing in said load and outputs a voltage value representative of said load current to said controller;
   a reference value output circuit, coupled to said controller, which outputs a reference value when said switch is placed in the ON state, said reference value beginning at a predetermined first level and being reduced with passage of time so as to converge to a predetermined second level while the switch remains in the ON state; and
   an overcurrent signal output circuit, coupled to said controller, which compares said voltage value with said reference value and outputs an overcurrent signal when said voltage value reaches or exceeds said reference value.

2. An overcurrent detection circuit according to claim 1, wherein said current detector comprises a voltage converting circuit that converts said load current into a voltage proportional to said load current; and
   wherein said reference value output circuit comprises a reference voltage generating circuit that generates a reference voltage at said predetermined second level, and a charge/discharge circuit which outputs a charge voltage charged from said predetermined second level to said predetermined first level when said switch is placed in the OFF state, and which discharges said charged voltage at a predetermined time constant when said switch is placed in the ON state.

3. An overcurrent detection circuit according to claim 1, further comprising an overcurrent judgement circuit that makes a judgment as to whether said overcurrent signal is outputted, and said controller places said switch in the OFF state when said judgment proves that said overcurrent signal is outputted.

4. An overcurrent detection circuit according to claim 2, further comprising a comparator that makes a judgment as to whether said overcurrent signal is outputted, and said controller places said switch in the OFF state when said judgment proves that said overcurrent signal is outputted.

5. An overcurrent detection circuit according to claim 1, wherein said reference value output circuit includes a temperature compensator.

6. An overcurrent detection circuit according to claim 2, wherein said reference value output circuit includes an impedance compensator that compensates for a change in impedance of the charge/discharge circuit.

7. An overcurrent detection circuit according to claim 1, wherein a reference voltage at the predetermined second level is set to a higher level than a voltage value obtained by said load current in a steady ON state.

* * * * *